United States Patent
Lukasik et al.

(10) Patent No.: US 11,192,210 B2
(45) Date of Patent: Dec. 7, 2021

(54) INJECTOR SLEEVE ASSEMBLY AND METHOD FOR FIELD REPAIR PROCEDURE

(71) Applicant: Cummins Inc., Columbus, IN (US)

(72) Inventors: Jeffrey D. Lukasik, Harborcreek, PA (US); Kenneth G. Mark, Dansville, NY (US); Kent H. Clark, Milford, MI (US)

(73) Assignee: Cummins Inc., Columbus, IN (US)

( * ) Notice: Subject to any disclaimer, the term of this patent is extended or adjusted under 35 U.S.C. 154(b) by 75 days.

(21) Appl. No.: 16/346,272

(22) PCT Filed: Jun. 20, 2017

(86) PCT No.: PCT/US2017/038258
§ 371 (c)(1),
(2) Date: Apr. 30, 2019

(87) PCT Pub. No.: WO2018/080598
PCT Pub. Date: May 3, 2018

(65) Prior Publication Data
US 2019/0255664 A1    Aug. 22, 2019

Related U.S. Application Data (60) Provisional application No. 62/414,996, filed on Oct. 31, 2016.

(51) Int. Cl.
*F02M 61/14* (2006.01)
*B23P 6/00* (2006.01)
(Continued)

(52) U.S. Cl.
CPC ............ *B23P 6/00* (2013.01); *B25B 23/0078* (2013.01); *B25B 27/0028* (2013.01);
(Continued)

(58) Field of Classification Search
CPC .. F02M 61/14; F02M 2200/858; F02M 61/16; F02M 61/168; F02M 53/04;
(Continued)

(56) References Cited

U.S. PATENT DOCUMENTS 3,605,703 A * 9/1971 Moulds ............... F02M 51/0675
123/478
4,018,462 A   4/1977 Saka
(Continued)

FOREIGN PATENT DOCUMENTS

CN    103753487 A    4/2014
DE   202010016349 U1   3/2011
(Continued)

OTHER PUBLICATIONS

International Search Report and Written Opinion issued by the ISA/US, Commissioner for Patents, dated Aug. 22, 2017, for International Application No. PCT/US2017/038258; 8 pages.
(Continued)

*Primary Examiner* — Michael A Kessler
(74) *Attorney, Agent, or Firm* — Faegre Drinker Biddle & Reath LLP (57) ABSTRACT

A retaining ring configured for in-field repair of a fuel injector sleeve upper seal leak, comprising: a circular side wall comprising a barrel-shaped outer surface and a substantially cylindrical inner surface; wherein the outer surface comprises a lower curved portion and a central portion having a curvature that is less pronounced than the lower curved portion; and wherein the lower curved portion is configured to guide the retaining ring into the fuel injector sleeve and the circular side wall has an outer diameter at the central portion that is larger than an inner diameter of the fuel injector sleeve at a location of the upper seal leak such that the retaining ring forces the fuel injector sleeve out-
(Continued)

wardly at the location of the upper seal leak as the retaining ring is moved into an installed position.

7 Claims, 9 Drawing Sheets

(51) Int. Cl.
  *B25B 23/00* (2006.01)
  *B25B 27/00* (2006.01)
  *F02M 53/04* (2006.01)
  *B23P 6/04* (2006.01)
(52) U.S. Cl.
  CPC .......... *F02M 53/043* (2013.01); *F02M 61/14* (2013.01); *B23P 6/04* (2013.01); *F02M 2200/858* (2013.01)
(58) Field of Classification Search
  CPC .. F02M 53/043; F02M 55/002; F02M 55/004; F02F 1/242; F02F 11/002; F16J 15/06; F16J 15/064
  USPC ......................................................... 123/470
  See application file for complete search history.

(56) References Cited

U.S. PATENT DOCUMENTS

| | | | |
|---|---|---|---|
| 5,345,913 A | 9/1994 | Belshaw et al. | |
| 6,289,876 B1 * | 9/2001 | Mackert | F02M 57/025 |
| | | | 123/470 |
| 6,866,026 B2 * | 3/2005 | Mickelson | F02M 61/14 |
| | | | 123/470 |
| 6,892,707 B2 | 5/2005 | Reiter et al. | |
| 8,230,838 B2 | 7/2012 | Clark et al. | |
| 9,364,924 B2 | 6/2016 | Neal et al. | |
| 9,370,845 B2 | 6/2016 | Shaw | |
| 9,382,887 B2 | 7/2016 | Clark et al. | |
| 2004/0069279 A1 * | 4/2004 | Maier | F02M 47/02 |
| | | | 123/467 |
| 2005/0129163 A1 | 6/2005 | Pabis et al. | |
| 2009/0255102 A1 * | 10/2009 | McMasters | F23R 3/14 |
| | | | 29/402.18 |
| 2010/0095500 A1 | 4/2010 | Whitaker | |
| 2011/0067653 A1 | 3/2011 | Clark et al. | |
| 2011/0303192 A1 * | 12/2011 | Jung | F02M 61/14 |
| | | | 123/445 |
| 2012/0139190 A1 * | 6/2012 | Doyle | F16L 23/20 |
| | | | 277/639 |
| 2015/0040857 A1 * | 2/2015 | Franks | F02M 61/14 |
| | | | 123/294 |
| 2019/0061072 A1 * | 2/2019 | Graham | B23P 6/02 |

FOREIGN PATENT DOCUMENTS

| | | |
|---|---|---|
| GN | 102510944 A | 6/2012 |
| JP | 55-565085 A | 4/1980 |
| JP | 55-065085 A | 5/1980 |

OTHER PUBLICATIONS

International Preliminary Report on Patentability issued by the IPEA/US, Commissioner for Patents, dated Oct. 19, 2018, for International Application No. PCT/US2017/038258; 16 pages.

* cited by examiner

INJECTOR SLEEVE ASSEMBLY AND METHOD FOR FIELD REPAIR PROCEDURE

RELATED APPLICATIONS

The present application is a U.S. national stage filing of PCT/US2017/038258, filed on Jun. 20, 2017, which claims priority to U.S. Provisional Application No. 62/414,996, filed on Oct. 31, 2016 and entitled "INJECTOR SLEEVE ASSEMBLY AND METHOD FOR FIELD REPAIR PROCEDURE," the entire disclosure of which being expressly incorporated herein by reference.

TECHNICAL FIELD

The present invention relates generally to fuel injector sleeve seals and more particularly to structure and methods for in-field repair of a fuel injector sleeve leak at an upper seal location.

BACKGROUND

Internal combustion engines having fuel injectors typically locate the injectors in bores formed in the cylinder head. An injector sleeve is normally inserted in the injector bore, and the injector is received within the sleeve. One or more coolant chambers are formed in the cylinder head and separated from the injector by the injector sleeve. To prevent leakage of coolant and/or combustion gas, a seal is typically formed between the sleeve and the cylinder bore above and below the coolant chamber. In some cases, one or both of the seals are formed of an elastomeric material.

It is not unusual for the upper elastomeric seal to degrade over time and require replacement. Without an authorized procedure, kit or tool available to perform replacement/repair of the seal outside the reconditioning facility or original factory, the entire cylinder head generally requires removal. This technique is expensive, labor intensive and requires significant engine downtime. In fact, the cost of a new or reconditioned cylinder head may be more than $4,000, and labor (e.g., approximately 20 hours) may add an additional $2,000 to the overall expense. Alternatively, expensive after-market kits are available to repair a leaking injector sleeve by means of threading in a tap and pulling the sleeve out of the cylinder head, then pressing in a new sleeve. A sealing compound is typically required and used in dry, pre-applied form or by using additional sealant at the sleeve-to-cylinder head interface. This approach is also expensive, time consuming and complicated, and requires the removal of the entire injector sleeve. Accordingly, it is desirable to provide an inexpensive, quick and simple approach to be used in the field for repairing a leaking upper seal between an injector sleeve and the injector bore.

SUMMARY

In one embodiment, the present disclosure provides a method of repairing a seal between a fuel injector sleeve and fuel injector bore, comprising: removing a fuel injector from the fuel injector sleeve; installing a retaining ring in the fuel injector bore, the retaining ring having a side wall with an outer surface having a curved portion adjacent at least one edge to guide the retaining ring into the fuel injector bore, the retaining ring further having an outer diameter that is larger than an inner diameter of the fuel injector sleeve at a location adjacent the seal such that when the retaining ring is in an installed position, the fuel injector sleeve is deformed outwardly toward the fuel injector bore, thereby repairing the seal; and replacing the fuel injector. In one aspect of this embodiment, installing the retaining ring comprises placing the retaining ring on an insertion tool, inserting the insertion tool into the fuel injector sleeve, and using the insertion tool to force the retaining ring into its installed position. In a variant of this aspect, using the insertion tool to force the retaining ring into its installed position comprises rotating a drive rod of the insertion tool to cause an engagement boss of the insertion tool to force the retaining ring into the fuel injector sleeve until a stop nut mounted to the drive rod engages an upper surface of the insertion tool. In another variant, installing the retaining ring comprises attaching the insertion tool to a cylinder head forming the fuel injector bore. In a further modification of this variant, attaching the insertion tool to the cylinder head comprises positioning a mounting bore of a handle body of the insertion tool in alignment with an opening in the cylinder head adjacent the fuel injector bore and threading a cap screw through the mounting bore into the opening. In another modification, attaching the insertion tool to the cylinder head comprises threading a bolt through an opening in an extension of a handle body of the insertion tool, thereby causing a foot connected to the bolt to engage a surface of the cylinder head. In another aspect of this embodiment, the retaining ring comprises an outer surface including at least one of an upper curved portion and a lower curved portion, and a central portion having a curvature that is less pronounced than upper curved portion and lower curved portion such that the outer surface resembles a barrel. In a variant of this aspect, installing the retaining ring comprises centering the retaining ring in the fuel injector sleeve by the at least one of an upper curved portion and a lower curved portion of the retaining ring. In another variant, the upper curved portion of the retaining ring is adjacent a substantially flat upper edge of the retaining ring and the lower curved portion of the retaining ring is adjacent a substantially flat lower edge of the retaining ring. In another aspect, the outer diameter of the retaining ring is larger than the inner diameter of the fuel injector sleeve by a distance in the range of 0.3 to 0.6 mm. In a variant of this aspect, the outer diameter of the retaining ring is larger than the inner diameter of the fuel injector sleeve by a distance in the range of 0.35 to 0.5 mm.

In another embodiment, the present disclosure provides a retaining ring configured for in-field repair of a fuel injector sleeve upper seal leak, comprising: a circular side wall comprising a barrel-shaped outer surface and a substantially cylindrical inner surface; wherein the outer surface comprises a lower curved portion and a central portion having a curvature that is less pronounced than the lower curved portion; and wherein the lower curved portion is configured to guide the retaining ring into the fuel injector sleeve and the circular side wall has an outer diameter at the central portion that is larger than an inner diameter of the fuel injector sleeve at a location of the upper seal leak such that the retaining ring forces the fuel injector sleeve outwardly at the location of the upper seal leak as the retaining ring is moved into an installed position. In one aspect of this embodiment, the circular side wall comprises an upper edge between the inner surface and the outer surface, and a lower edge between the inner surface and the outer surface. In a variant of this aspect, the lower curved portion is adjacent the lower edge of the circular side wall. In another aspect, the circular side wall defines a central opening having a substantially constant diameter between the upper edge and the lower edge of the circular side wall. In still another aspect, the outer surface further comprises an upper curved portion adjacent the upper edge. In yet another aspect, the outer diameter at the central portion of the retaining ring is larger than the inner diameter of the fuel injector sleeve by a distance in the range of 0.3 to 0.6 mm. In a variant of this aspect, the outer diameter at the central portion of the retaining ring is larger than the inner diameter of the fuel injector sleeve by a distance in the range of 0.35 to 0.5 mm.

In yet another embodiment, the present disclosure provides a system for in-field repair of a fuel injector sleeve upper seal leak, comprising: a retaining ring comprising a circular side wall having an outer surface and defining a central opening, the outer surface comprising a lower portion configured to guide the retaining ring into the fuel injector sleeve and a central portion having a diameter that is larger than an inner diameter of the fuel injector sleeve adjacent the upper seal leak; and an insertion tool comprising a handle, a threaded drive rod coupled to the handle and a guide end coupled to the threaded drive rod and configured to extend into the fuel injector sleeve, the handle including a mounting bore configured to receive a cap screw for mounting the insertion tool to a cylinder head of an engine, the threaded drive rod including a drive head, and the guide end being configured to extend through the central opening of the retaining ring and having an engagement boss that forces the retaining ring into an installed position in the fuel injector sleeve in response to rotation of the drive head when the handle is mounted to the cylinder head; wherein the outer surface of the retaining ring forces the fuel injector sleeve outwardly at the location of the upper seal leak as the retaining ring is forced into its installed position. In one aspect of this embodiment, the central portion of the outer surface has a curvature that is less pronounced than a curvature of the lower portion. In a variant of this aspect, the retaining ring further comprises an upper portion having a curvature that is more pronounced than the curvature of the central portion such that the outer surface resembles a barrel. In still another aspect of this embodiment, the insertion tool handle includes an extension opposite the mounting bore, the extension including an opening for receiving a bolt coupled to a foot configured to engage the cylinder head.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The present disclosure provides a field repair procedure and system that permits repair of a leaking elastomeric (or other material) upper injector seal without the need to remove the cylinder head or injector sleeve. As is further described below, a retaining ring having a barrel shaped outer contour which is substantially self-centering and self-guiding is installed into the injector sleeve in-situ and sized with an outer diameter which is larger than the inner diameter of the injector sleeve to cause an interference fit that re-establishes sealing capability after a leak has developed. Installation of the retainer ring may be accomplished using a simple pressing or impact tool which extends into the cylinder bore to seat to the proper depth. Using the procedure and system described herein, a seal may be repaired for a small fraction of the cost with greatly reduced engine downtime.

Figure 1:
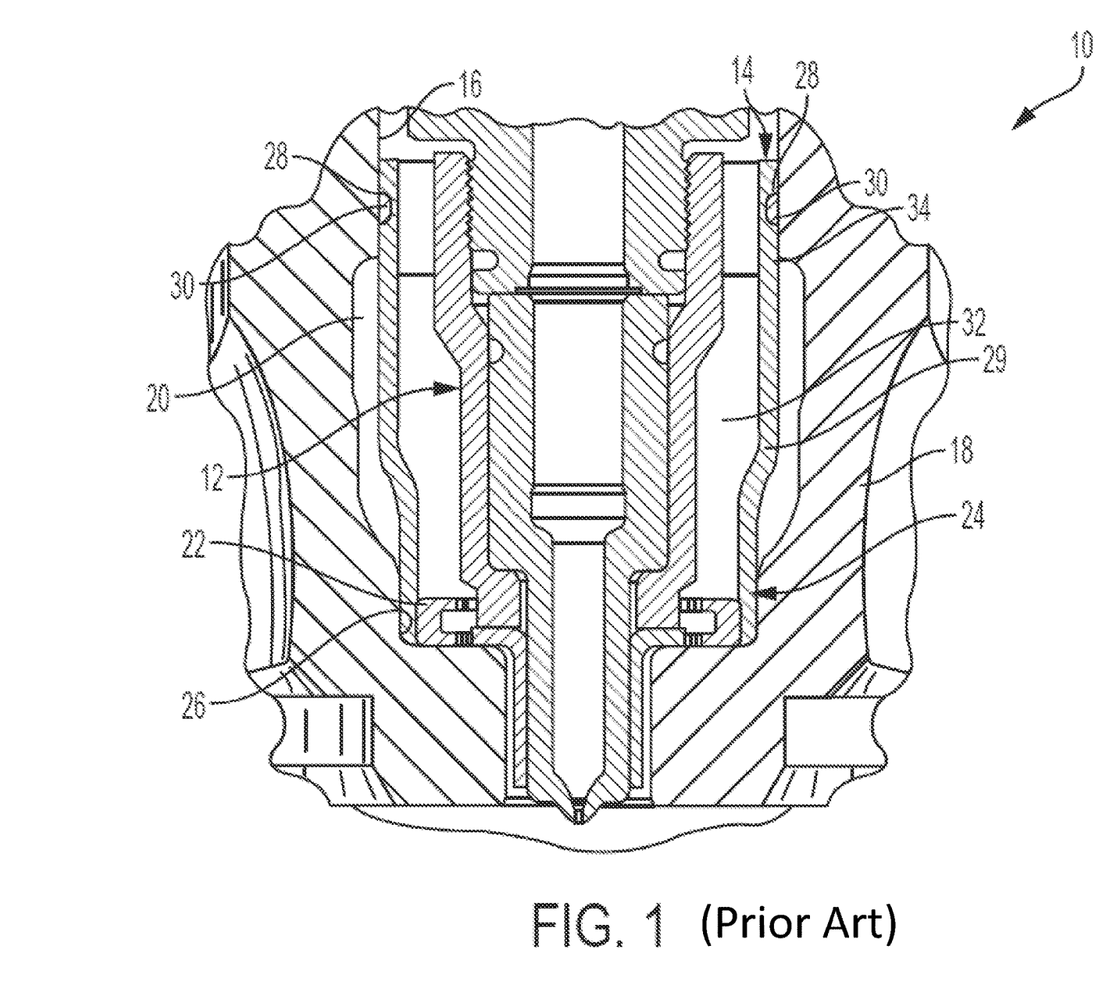
FIG. 1 is a cross-sectional view of a fuel injector assembly.

Referring now to FIG. 1, a typical fuel injector assembly 10 is shown. Assembly 10 generally includes a fuel injector 12 disposed within an injector sleeve 14, which in turn is disposed within an injector bore 16 formed in a cylinder head 18. Cylinder head 18 includes a coolant passage 20 in fluid communication with injector bore 16. A retaining ring 22 may be positioned in the lower portion of sleeve 14 to provide a lower seal of coolant passage 20 at an interface portion 24 having a bore sealing surface 26 as described in U.S. Pat. No. 8,230,838, entitled INJECTOR SEAL ASSEMBLY AND METHOD OF SEALING A COOLANT PASSAGE FROM AN INJECTOR, which is also owned by the present assignee, the entire disclosure of which being expressly incorporated herein by reference. Sleeve 14 generally has a side wall 29 with a cylindrical or tubular shape formed of appropriate material to be slip fit into place in bore 16. At an upper end, sleeve 14 typically includes an annular groove 28 for receiving a seal ring 30 which may be made of an elastomeric material. In other embodiments, seal ring 30 and annular groove 28 may be omitted, or replaced with a series of shallow grooves to enhance plasticity of the sleeve outer surface. In either case, the sleeve 14 is sized with an appropriate diameter to create a close fit, and is then typically rolled with a conventional rolling device to form a seal with bore 16 and create a slight locking feature of sleeve material into the coolant passage. In this manner, coolant passage 20 is separated from the annular chamber 32 between injector 12 and sleeve 14, which usually is filled with low pressure fuel. As shown, in certain embodiments the upper end of sleeve 14 has a burnished area 34.

Figure 2:
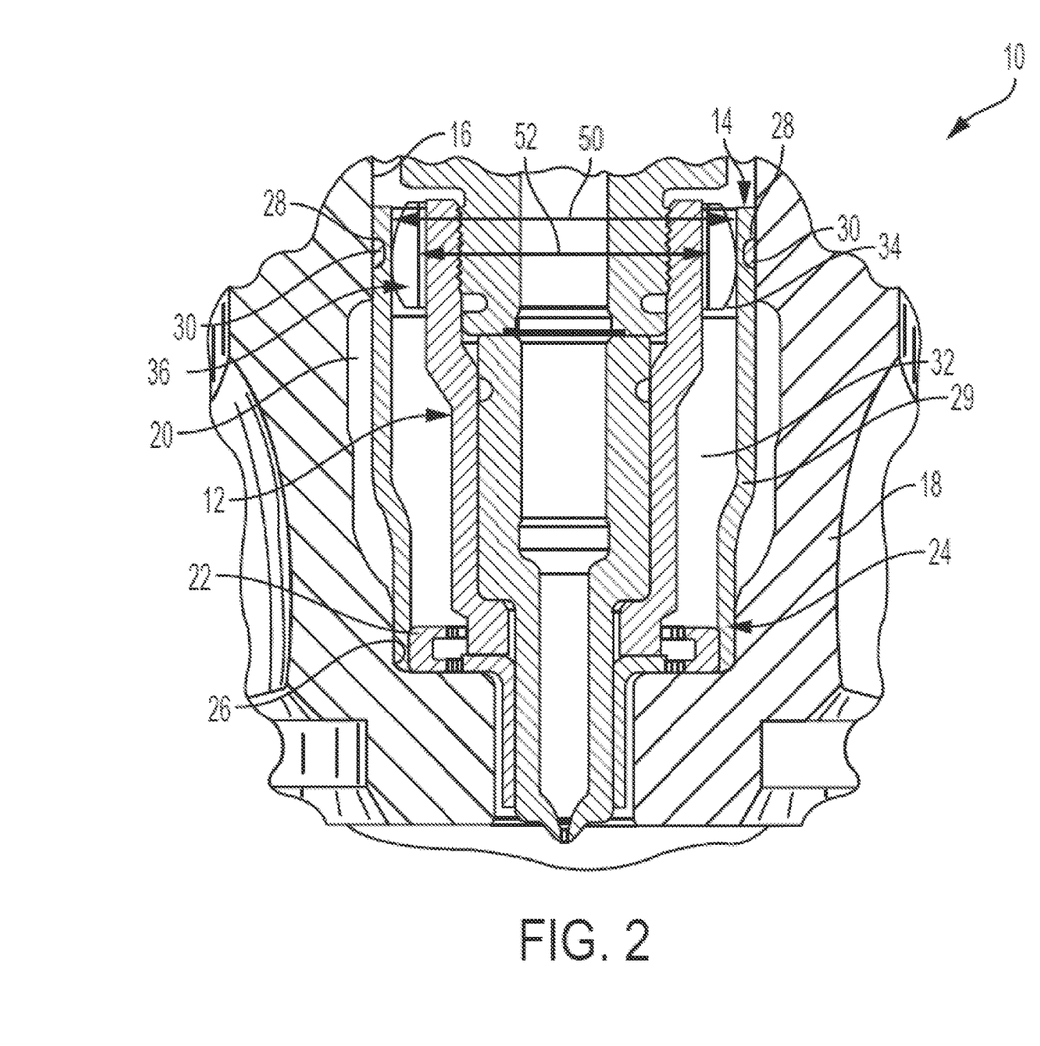
FIG. 2 is a cross-sectional view of a fuel injector assembly having a retaining ring according to one embodiment of the present disclosure installed to repair an upper seal leak of a fuel injector.

Under certain conditions and/or over time, seal ring 30 may degrade and leak. As indicated above, replacement/repair of seal ring 30 using conventional techniques may be expensive, time consuming and complicated. The present disclosure provides a technique and system for repairing the seal provided by seal ring 30 in the field without removing sleeve 14 and without replacing cylinder head 18. According to one embodiment of the present disclosure, a retaining ring 36 is provided to repair the seal provided by seal ring 30. As shown generally in FIG. 2, retaining ring 36 is positioned between fuel injector 12 and injector sleeve 14 to press outwardly against sleeve 14 to repair the seal earlier provided by the damaged/degraded seal ring 30.

Figure 3A:
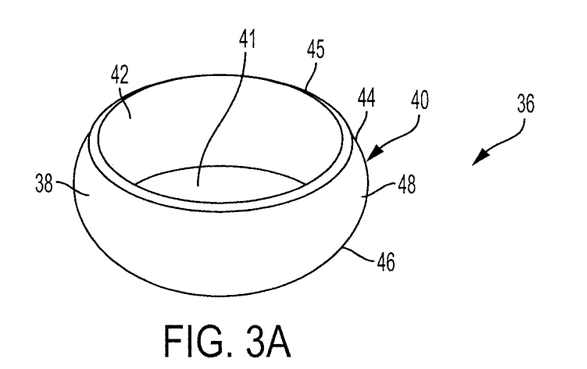
FIG. 3A is a perspective view of the retaining ring of FIG. 2.
Figure 3B:
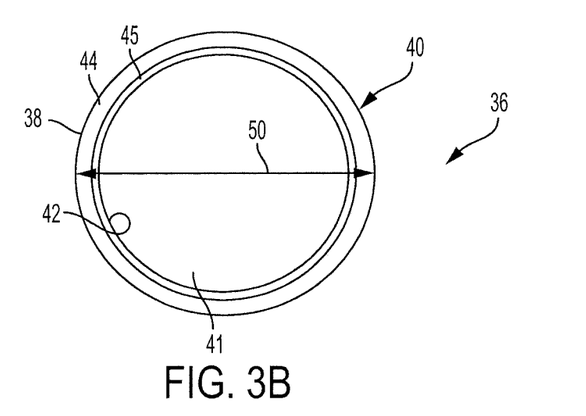
FIG. 3B is a top plan view of the retaining ring of FIG. 2.
Figure 3C:
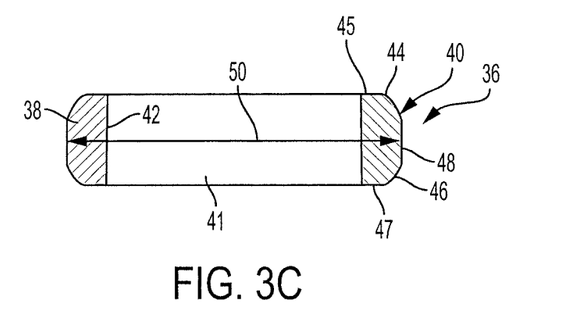
FIG. 3C is a cross-sectional view of the retaining ring of FIG. 2.

Referring now to FIG. 3A-3C, retaining ring 36 is a generally ring-shaped component having a generally circular side wall 40 (FIG. 3A) defining a central opening 41. Side wall 40 includes a generally barrel-shaped outer surface 38 and a cylindrical inner surface 42 having a substantially constant cross-section. Outer surface 38 includes a curved upper portion 44 and a curved lower portion 46 connected by a central portion 48 with a less pronounced curvature. Side wall 40 further includes a substantially flat upper edge 45 and a substantially flat lower edge 47. Central opening 41 has a substantially constant diameter 50 between upper edge 45 and lower edge 47 of circular side wall 40. In some embodiments, retaining ring 36 is formed from steel although other materials may be suitable in certain applications. As should be apparent from the description herein, retaining ring 36 may be inserted into sleeve 14 upper edge 45 first or lower edge 47 first. In other embodiments, retaining ring 36 includes only one of curved upper portion 44 or curved lower portion 46. In such an embodiment, the edge 45, 47 corresponding to the curved portion provided must be installed first to permit the guiding and self-centering described herein.

As a typical injector sleeve 14 has little or no leading chamfer along its upper edge, during insertion lower portion 46 of outer surface 38 permits retaining ring 36 to be centered and guided into an installed state as is further described below. At least at central portion 48, retaining ring 36 has an outer diameter 50 that is greater than an inner diameter 52 (FIG. 2) of burnished area 34 of sleeve 14. Because of this, insertion of retaining ring 36 into burnished area 34 of sleeve 14 (with a tool such as that described below) expands sleeve 14 at burnished area 34 to cause sleeve 14 (with or without an elastomeric seal ring 30) to provide additional sealing pressure between sleeve 14 and bore 16 to prevent leakage and repair the earlier provided seal. In one embodiment, outer diameter 50 is larger than inner diameter 52 by a distance in the range of 0.3 to 0.6 mm, and more preferably in the range of 0.35 to 0.5 mm.

Figure 4:
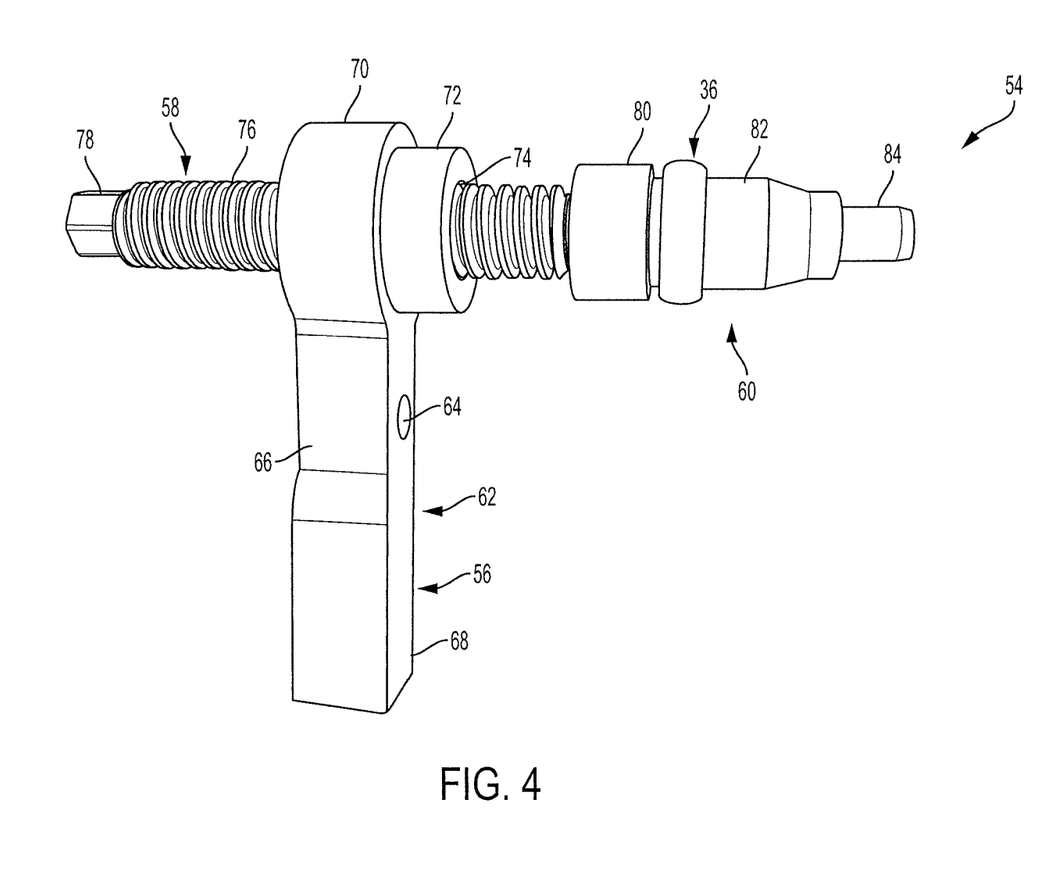
FIG. 4 is a perspective view of an insertion tool for inserting the retaining ring of FIG. 2.

Referring now to FIG. 4, one example insertion tool 54 is depicted with a retaining ring 36 mounted for insertion into injector sleeve 14. Tool 54 generally includes a handle 56, a threaded drive rod 58 and a guide end 60. Handle 56 includes a body 62 having a mounting bore 64 that extends between an upper side 66 of body 62 to a lower side 68 of body 62 and a drive end 70 having a boss 72. A threaded opening 74 extends through drive end 70 and receives drive rod 58. Drive rod 58 includes a threaded body 76 having a drive head 78 at one end and a rotatable coupling 79 (FIG. 6) at the end connected to guide end 60. Guide end 60 has an upper engagement boss 80, a cylindrical body 82 sized to receive retaining ring 36, and a tip 84 configured to bottom out in injector bore 16. As is further described below, when guide end 60 is fully inserted into injector sleeve 14, tip 84 limits the insertion distance and engagement boss 80 locates retaining ring 36 at the proper installed location. Although FIG. 6 shows tip 84 limiting travel when contacting the cylinder head and controlling the insertion depth of retaining ring 36, this feature is not necessary and may be replaced, in other embodiments, by a guide end 60 possessing a diameter slightly undersized from the injector bore and slightly oversized from the injector sleeve diameter to limit travel upon contacting the upper edge face of sleeve 14.

Figure 5:
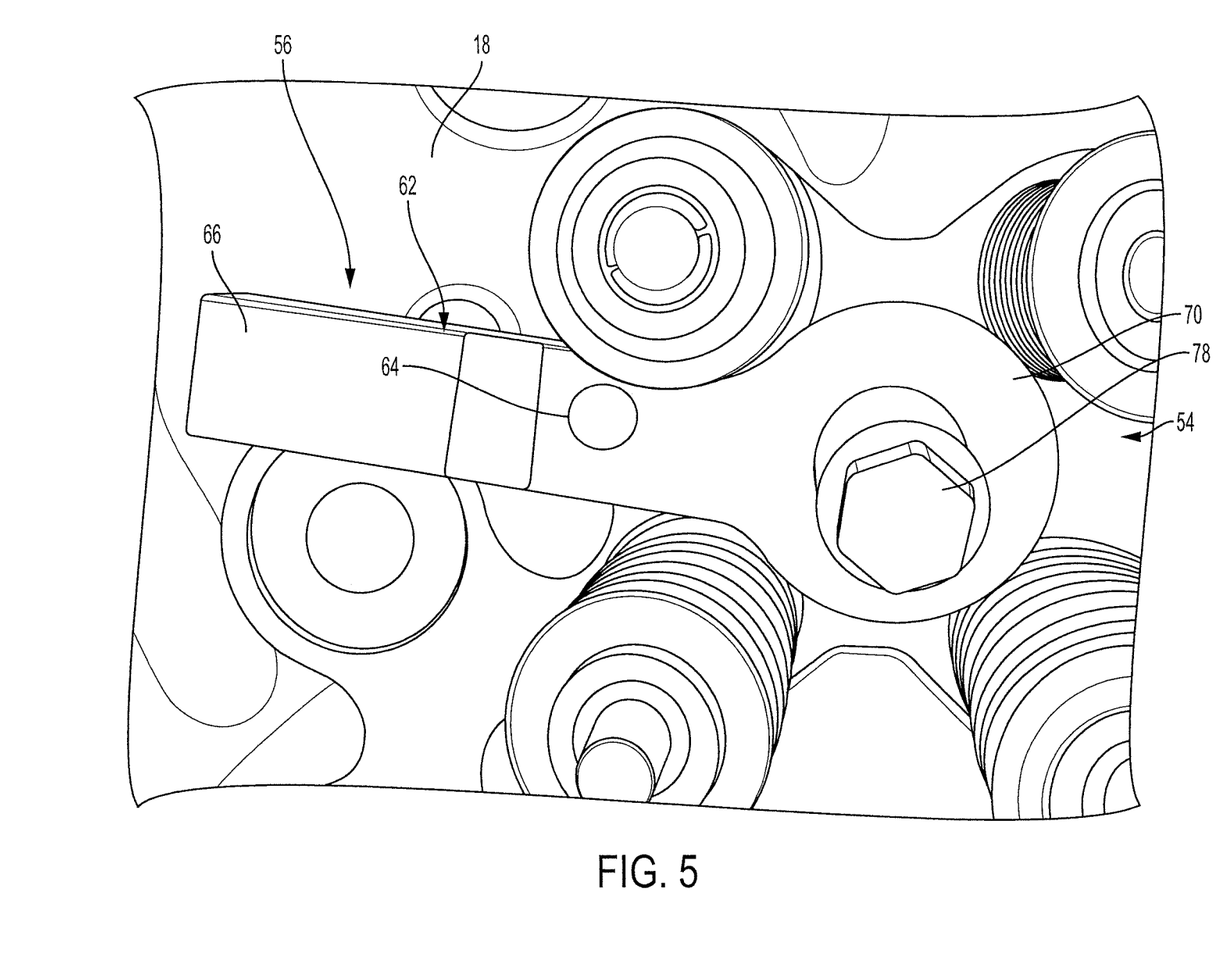
FIG. 5 is a top plan view of the insertion tool of FIG. 4.
Figure 6:
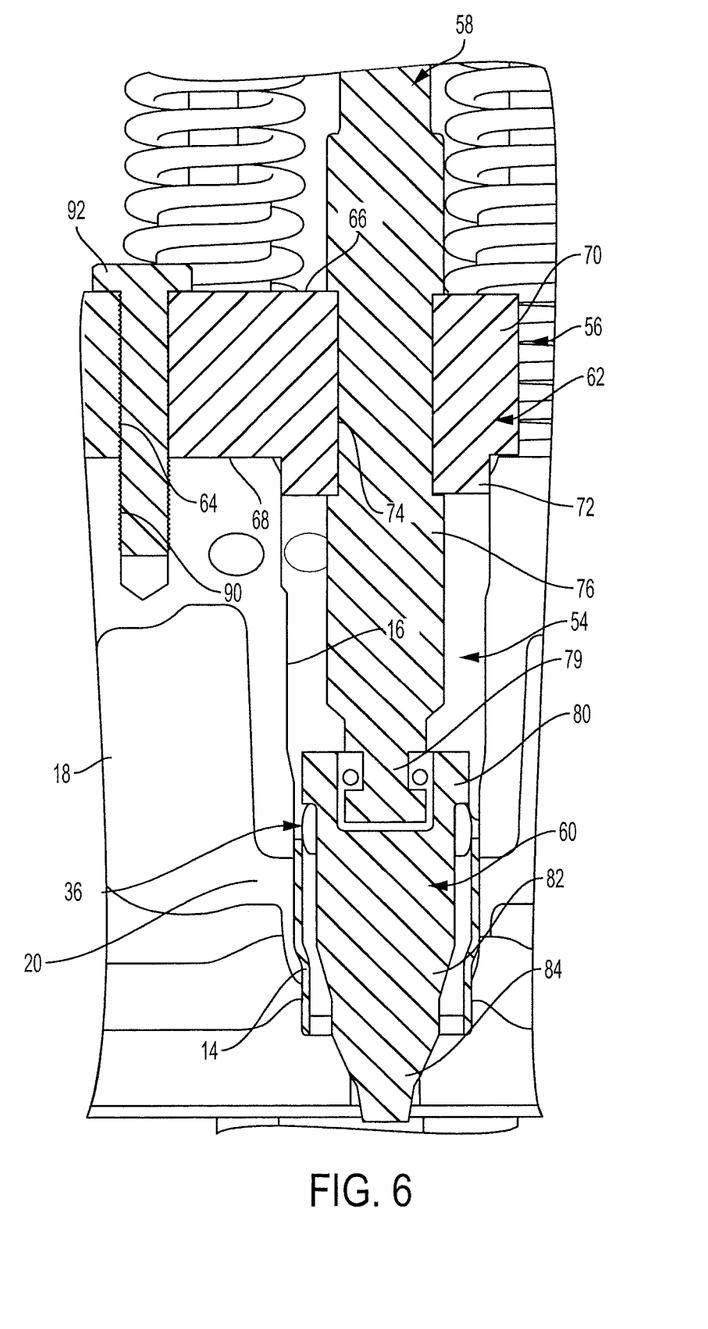
FIG. 6 is a cross-sectional side view of the insertion tool of FIG. 4 being used to install the retaining ring of FIG. 2.

Referring now to FIGS. 5 and 6, retaining ring 36 is inserted into sleeve 14 to repair the seal provided by seal ring 30 using tool 54 in the following manner. After the injector clamp (not shown) is removed, fuel injector 12 is removed from sleeve 14. A retaining ring 36 is placed onto body 82 of guide end 60 of tool 54. Guide end 60 (with retaining ring 36) is then inserted into injector bore 16 and positioned down into sleeve 14. Boss 72 of drive end 70 of handle 56 is positioned into injector bore 16 as shown in FIG. 6 to properly orient drive rod 58. Mounting bore 64 is positioned on handle body 62 to align with a threaded opening 90 adjacent injector bore 16 normally used to receive a bolt for attaching the injector hold down clamp (not shown). A bolt 92 is passed through mounting bore 64 and threaded into opening 90 until handle 56 is tightly attached to cylinder head 18. After handle 56 (and therefore tool 54) is secured to cylinder head 18, a tool such as a wrench is used to rotate drive head 78 of drive rod 58, thereby forcing guide end 60 downwardly into sleeve 14. As guide end 60 moves downwardly, engagement boss 80 of guide end 60 forces retaining ring 36 into sleeve 14. As retaining ring 36 engages the upper edge of sleeve 14, one of curved portions 44, 46 (depending on the orientation of ring 36) of outer surface 38 guides and centers retaining ring 36 into sleeve 14. Drive head 78 is further rotated until tip 84 of guide end 60 bottoms out in injector bore 16. When this occurs, retaining ring 36 is positioned at the proper depth in its installed position within sleeve 14, and its larger outer diameter relative to the inner diameter of sleeve 14 applies outwardly directed force that re-stablishes a seal between sleeve 14 and bore 16 where the failed seal ring 30 is located. It should be understood that retaining ring 36 could be removed from sleeve 14 using a suitable tool that engages the lower edge (45 or 47) of retaining ring 36 and applies upward force to pull retaining ring 36 out of sleeve 14.

Figure 7:
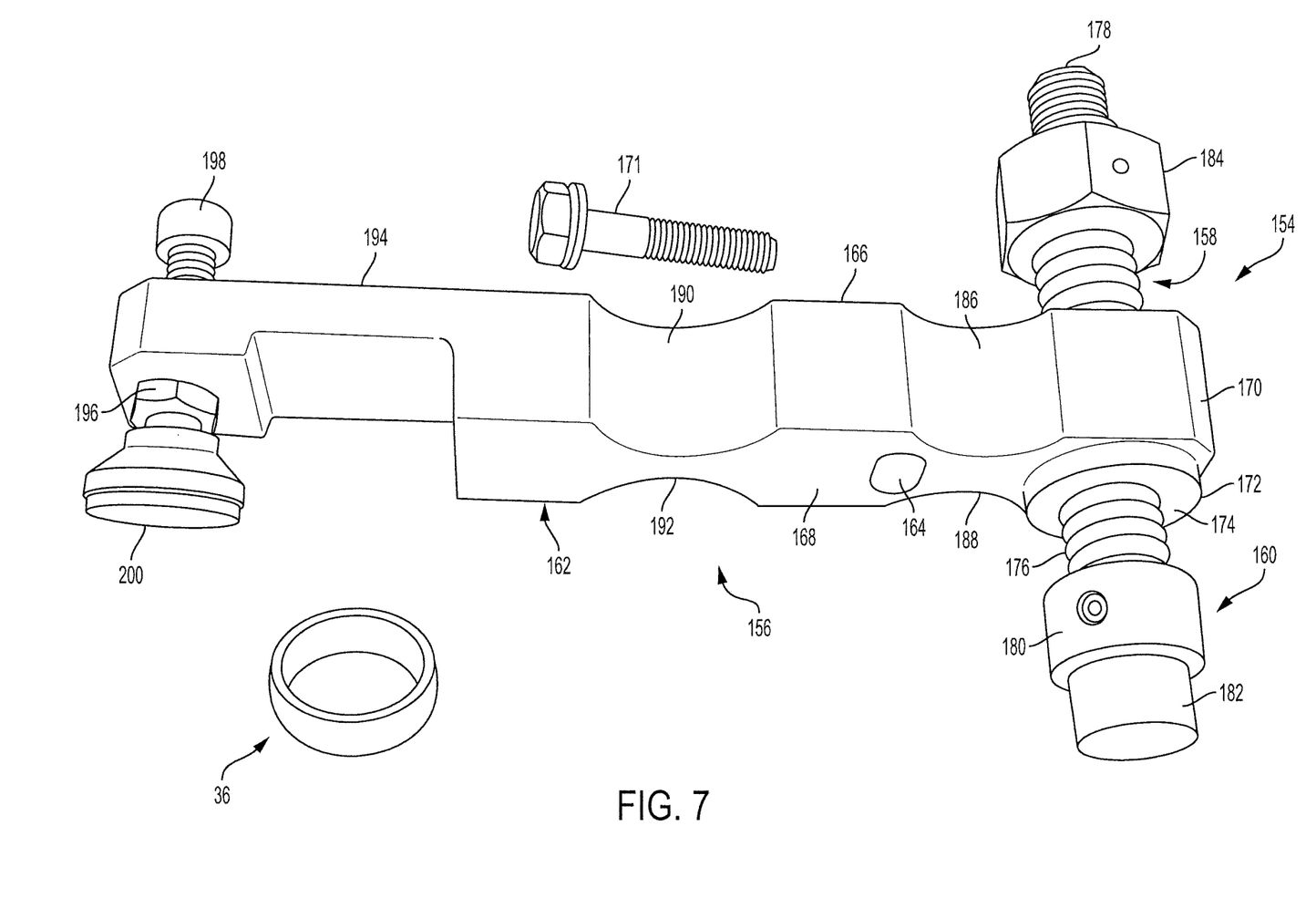
FIG. 7 is a perspective view of another embodiment of an insertion tool for inserting the retaining ring of FIG. 2.

Referring now to FIG. 7, another example insertion tool 154 is depicted for installing a retaining ring 36 into injector sleeve 14. Like tool 54 of FIG. 4, tool 154 generally includes a handle 156, a threaded drive rod 158 and a guide end 160. Handle 156 includes a body 162 having a mounting bore 164 that extends between an upper side 166 of body 162 to a lower side 168 of body 162 and a drive end 170 having a boss 172. As described below, a cap screw 171 extends through mounting bore 164 to attach tool 154 to cylinder head 18. A threaded opening 174 extends through drive end 170 and receives drive rod 158. Drive rod 158 includes a threaded body 176 having a drive head 178 at one end and a rotatable coupling 179 (FIG. 9) at the end connected to guide end 160. Guide end 160 has an upper engagement boss 180, and a cylindrical body 182 sized to receive retaining ring 36. Drive rod 158 further includes a stop nut 184 that, in one embodiment, is attached in a fixed position on threaded body 176 adjacent drive head 178. As explained herein, as drive rod 158 is rotated using drive head 178, drive rod threads through drive end 170 of handle 156 and urges retaining ring 36 into injector bore 16. Stop nut 184 may be positioned on drive rod 158 to engage upper surface 166 of handle 156 to set the depth of insertion of retaining ring 36. In this manner, stop nut 184 provides for a repeatable insertion depth of retaining ring 36 and prevents over-tightening or under-tightening. In another embodiment, stop nut 184 may be adjustably positioned on drive rod 158 to provide for various different insertion depths.

Figure 8:
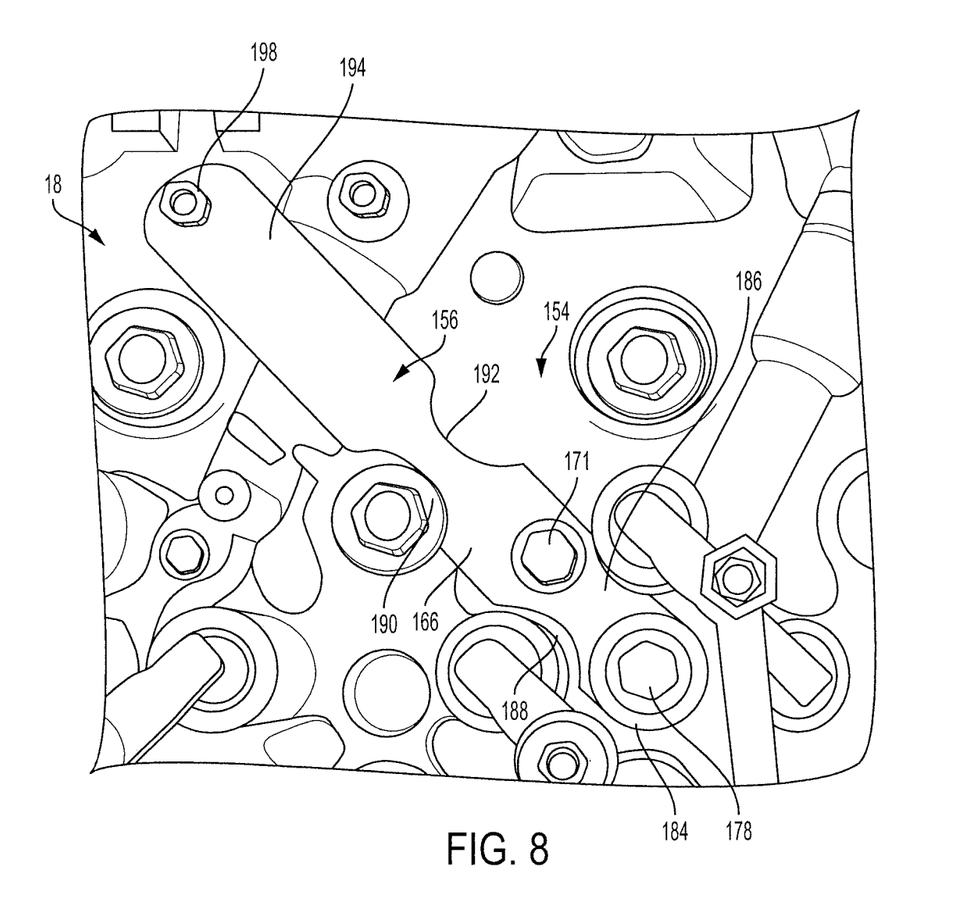
FIG. 8 is a top plan view of the insertion tool of FIG. 7.

Handle body 162 further includes a pair of forward recesses 186, 188 configured to provide clearance for valve springs as depicted in FIG. 8 when tool 154 is attached to cylinder head 18. Body 162 also has a pair of rearward recesses 190, 192 configured to provide clearance for cylinder head cap screws as shown in FIG. 8. Finally, handle body 162 includes an extension 194 having a threaded opening 196. A threaded bolt 198 extends through opening 196 and is pivotally connected to a foot 200. As is further described herein, bolt 198 is used to tighten foot 200 into engagement with cylinder head 18 to counter-balance the force applied when drive rod 158 is threaded into injector bore 16.

Figure 9:
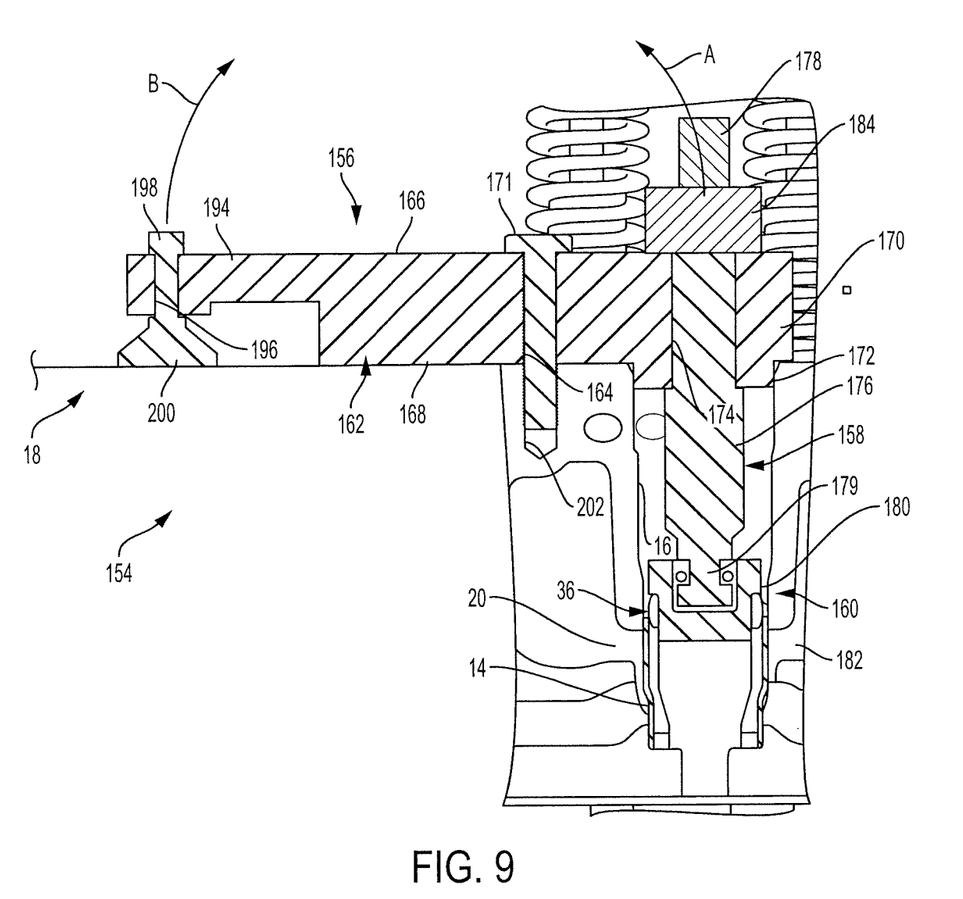
FIG. 9 is a cross-sectional side view of the insertion tool of FIG. 7 being used to install the retaining ring of FIG. 2.

Referring now to FIGS. 8 and 9, retaining ring 36 is inserted into sleeve 14 to repair the seal provided by seal ring 30 using tool 154 in the following manner. After the injector clamp (not shown) is removed, fuel injector 12 is removed from sleeve 14. A retaining ring 36 is placed onto body 182 of guide end 160 of tool 154. Guide end 160 (with retaining ring 36) is then inserted into injector bore 16 and positioned down into sleeve 14. Boss 172 of drive end 170 of handle 156 is positioned into injector bore 16 as shown in FIG. 9 to properly orient drive rod 158. Mounting bore 164 is positioned on handle body 162 to align with a threaded opening 202 adjacent injector bore 16 normally used to receive a bolt for attaching the injector hold down clamp (not shown). Cap screw 171 is passed through mounting bore 164 and threaded into opening 202 until handle 156 is tightly attached to cylinder head 18. Bolt 198 is then tightened to force foot 200 into engagement with cylinder head 18.

After handle 156 (and therefore tool 154) is secured to cylinder head 18 in the manner described above, a tool such as a wrench is used to rotate drive head 178 of drive rod 158, thereby forcing guide end 160 downwardly into sleeve 14. As guide end 160 moves downwardly, engagement boss 180 of guide end 160 forces retaining ring 36 into sleeve 14. As retaining ring 36 engages the upper edge of sleeve 14, one of curved portions 44, 46 (depending on the orientation of ring 36) of outer surface 38 guides and centers retaining ring 36 into sleeve 14. Drive head 178 is further rotated until stop nut 184 engages upper surface 166 of drive end 170. When this occurs, retaining ring 36 is positioned at the proper depth in its installed position within sleeve 14, and its larger outer diameter relative to the inner diameter of sleeve 14 applies outwardly directed force that re-stablishes a seal between sleeve 14 and bore 16 where the failed seal ring 30 is located. It should be understood that retaining ring 36 could be removed from sleeve 14 using a suitable tool that engages the lower edge (45 or 47) of retaining ring 36 and applies upward force to pull retaining ring 36 out of sleeve 14.

As drive rod 158 forces retaining ring 36 downwardly into position within sleeve 14, reaction forces are directed upwardly, urging tool 154 approximately in direction A of FIG. 9. This force may damage cap screw 171 or other components of tool 154. In this embodiment, when foot 200 of extension 194 engages cylinder head 18, a similar reaction force is generated, urging tool 154 approximately in direction B of FIG. 9. This reaction force serves to counter balance the force in direction A, and inhibits damage to tool 154. In this manner, the life of tool 154 is extended such that it may be used repeatedly to install multiple retaining rings 36.

It should also be understood that the principles described herein may also be used for initial manufacturing assembly of fuel injector sleeves in cylinder heads. This would eliminate the need for burnishing and the time associated with that operation. Moreover, in certain applications it would eliminate the need for an elastomeric upper injector seal.

It should be further understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A rigid retaining ring configured for in-field repair of a fuel injector sleeve having an upper portion and a lower portion, comprising: a circular side wall having a barrel-shaped outer surface and a substantially cylindrical inner surface; and wherein: the outer surface comprises a lower curved portion having a curvature and a central portion having a curvature that is less pronounced than the curvature of the lower curved portion; the lower curved portion is configured to guide the rigid retaining ring into the upper portion of the fuel injector sleeve; and the circular side wall has an outer diameter at the central portion that is larger than an inner diameter of the upper portion of the fuel injector sleeve at a location of an upper seal leak such that the rigid retaining ring forces the upper portion of the fuel injector sleeve to deform outwardly at the location of the upper seal leak toward a fuel injector bore, thereby repairing the seal leak as the rigid retaining ring is moved into an installed position.

2. The rigid retaining ring of claim 1, wherein the circular side wall comprises an upper edge between the inner surface and the outer surface, and a lower edge between the inner surface and the outer surface.

3. The rigid retaining ring of claim 2, wherein the lower curved portion is adjacent the lower edge of the circular side wall.

4. The rigid retaining ring of claim 2, wherein the circular side wall defines a central opening having a substantially constant diameter between the upper edge and the lower edge.

5. The rigid retaining ring of claim 2, wherein the outer surface further comprises an upper curved portion adjacent the upper edge of the circular side wall.

6. The rigid retaining ring of claim 1, wherein the outer diameter at the central portion is larger than the inner diameter of the upper portion of the fuel injector sleeve by a distance in a range of 0.3 to 0.6 mm.

7. The rigid retaining ring of claim 6, wherein the outer diameter at the central portion is larger than the inner diameter of the upper portion of the fuel injector sleeve by a distance in a range of 0.35 to 0.5 mm.

* * * * *